United States Patent Office 3,555,064
Patented Jan. 12, 1971

3,555,064
METHOD FOR THE MANUFACTURE OF PHENYL AND METHYLPHENYLCHLOROSILANES
Raisa Anatolievna Turetskaya, Protochny pereulok 16/1, kv. 9; Tamara Alexandrova Tsvanger, Ul. Z. and A. Kosmodemyanskikh 4, kv. 7; and Sergei Alexandrovich Golubtsov, 3 Vladimirskaya ul. 4a, kv. 89, all of Moscow, U.S.S.R.; Margarita Andreevna Luzganova, Respublikanskaya ul. 6, St. Kraskovo, Moskovskaya oblast, U.S.S.R.; Vadim Nikolaevich Pensky, 2 Vladimirskaya ul. 56, kv. 60, Moscow, U.S.S.R.; Ljudmila Petrovna Filjukova, Malaya Kolkhoznaya ul. 7, poselok Kotelniki, Ljubertsy, U.S.S.R.; and Alexandr Georgievich Pogorelov, Novye Cheremushki 30, kvartal, korpus 42, kv. 36, Moscow, U.S.S.R.
No Drawing. Filed Dec. 22, 1967, Ser. No. 692,673
Int. Cl. C07f 7/16
U.S. Cl. 260—448.2    4 Claims

ABSTRACT OF THE DISCLOSURE

Phenylchlorosilanes and methylphenylchlorosilanes are produced by reacting chlorobenzene and methyl chloride with silicon in the presence of a copper catalyst which is promoted by a zinc compound and cadmium chloride or oxide.

---

This invention relates to methods for the manufacture of phenyl- and methylphenylchlorosilanes.

Phenyl- and methylphenylchlorosilanes are useful in the preparation of silicon varnishes, fluids, rubbers and plastics.

It is known to prepare phenylchlorosilanes by a direct process from chlorobenzene and elemental silicon in the presence of a copper catalyst promoted by zinc or zinc compounds, such as zinc chloride or zinc oxide.

It is also known to prepare methylphenylchlorosilanes by causing a mixture of chlorobenzene and methyl chloride to react directly with silicon in the presence of a zinc or aluminum promoted copper catalyst.

The known methods of preparing phenylchlorosilanes have disadvantages in that the reaction products contain a fairly high percentage (up to 17%) of by-product benzene and diphenyl, and the yield of phenylchlorosilane per kg. of contact mass per hour is relatively low (not more than 80 g.). The content of diphenyldichlorosilanes in the reaction mixture does not exceed 60%.

The known method of preparing methylphenylchlorosilanes suffers from the disadvantage of providing a very low yield (up to 5 g. per kg. of contact mass per hour) of methylphenyldichlorosilane, the most valuable reaction product. The yield of a mixture of phenylchlorosilanes is also low (up to 10 g. per kg. of contact mass per hour). The reaction product mixture contains from 7 to 13% of methylphenyldichlorosilane.

The term "contact mass" denotes a mixture of silicon, copper catalyst, and promoters.

It is an object of the present invention to eliminate the aforementioned disadvantages.

It is a further and more specific object of the present invention to provide a method for the manufacture of phenyl- and methylphenylchlorosilanes which makes it possible to increase the yield of product compounds per kg. of contact mass per hour, to obtain a higher content of diphenyldichlorosilane and methylphenyldichlorosilane in the reaction mixture, and also to reduce the yield of undesirable by-products.

This object is accomplished by reacting chlorobenzene or a mixture of chlorobenzene and methyl chloride with silicon in the presence of a copper catalyst promoted by zinc or zinc compounds, wherein, according to the invention, the copper catalyst used is further promoted by cadmium or cadmium compounds, such as cadmium chloride or cadium oxide.

The method of the present invention is accomplished in the following manner.

Upon vaporization, chlorobenzene or a mixture of chlorobenzene and methyl chloride is passed at an elevated temperature, through a contact mass bed, the contact mass being composed of silicon, copper, zinc or a zinc compound, and cadmium or a cadmium compound. The reaction products are condensed, and the thus obtained mixture is analyzed by the gas-liquid chromatography.

For a better understanding of the invention, the following examples are presented by way of illustration.

EXAMPLE 1

Into a vertical stainless steel reactor, which consists of a tube 50 mm. in diameter and furnished with a cone-type gas distributor and a stirrer, are charged 200 g. of a powdered material containing 35% copper, 62% silicon, 1% zinc oxide, and 2% cadmium chloride. The reactor is gradually heated to a temperature of 430° C. while passing through it a stream of nitrogen. Then, chlorobenzene vapors are fed into the reactor at a rate of 40 g. per hour, the reactor temperature being maintained at 430–440° C. After 8 hours of reactor operation, there collects 264 g. of a mixture containing 4% benzene, 11% phenyltrichlorosilane, 0.5% diphenyl, 75% diphenyldichlorosilane, and 8% triphenylchlorosilane.

The production rate of the contact mass equals 156 grams of the mixture of phenylchlorosilanes per kg. of contact mass per hour, or 124 grams of diphenyldichlorosilane per kg. of contact mass per hour.

EXAMPLE 2

Into the reactor as described in Example 1 is fed chlorobenzene at a rate of 60 g. per hour, the reactor temperature being 480–490° C. After 8 hours of reactor operation, there collects 385 g. of a reaction mixture containing 9% benzene, 23% phenyltrichlorosilane, 2% diphenyl, 55% diphenyldichlorosilane, and 3% triphenylchlorosilane.

The production rate equals 280 g. per kg. of contact mass per hour.

EXAMPLE 3

Into the reactor as described in Example 1 are charged 200 g. of a powdered material containing 35% copper, 62% silicon, 1% zinc oxide, and 2% cadmium chloride.

The reactor is gradually heated to a temperature of 430° C. while passing through it a stream of nitrogen. Then the vapors of chlorobenzene and methyl chloride are simultaneously fed into the reactor, the feed rate being 30 g./hr. and 6.7 g./hr., respectively ($C_6H_5Cl$ to $CH_3Cl$ molar ratio equals 2.0). After 8 hours of reactor operation, there collects 240 g. of a mixture containing 7% methylchlorosilanes, 15% methylphenyldichlorosilane, 38% diphenyldichlorosilane, 6% triphenylchlorosilane, 15% phenyltrichlorosilane, and 11% benzene.

The production capacity of the contact mass equals 22.5 grams of methylphenyldichlorosilane and 111 grams of phenylchlorosilane mixture per kg. of contact mass per hour.

What we claim is:

1. A method for the manufacture of phenylchlorosilanes, which comprises reacting chlorobenzene with silicon in the presence of a copper catalyst and a promoter, said promoter being zinc or a compound thereof and cadmium chloride or cadmium oxide.

2. A method for the manufacture of methylphenylchlorosilanes, which comprises reacting a mixture of chlorobenzene and methyl chloride with silicon in the presence of a copper catalyst and a promoter, said promoter being zinc or a zinc compound, and cadmium or cadmium oxide.

3. A method as claimed in claim 1, wherein the zinc or zinc compound is present in an amount of not more than 15% of the weight of the copper catalyst and the cadmium chloride or cadmium oxide is present in an amount of not more than 30% of the weight of the copper catalyst.

4. A method as claimed in claim 2, wherein the zinc or zinc compound is present in an amount of not more than 15% of the weight of the copper catalyst and the cadmium chloride or cadmium oxide is present in an amount of not more than 30% of the weight of the copper catalyst.

References Cited

UNITED STATES PATENTS

| 2,464,033 | 3/1949 | Gilliam | 260—448.2(T) |
| 2,903,473 | 9/1959 | Takami et al. | 260—448.2(T) |

FOREIGN PATENTS

| 174,185 | 10/1965 | U.S.S.R. |
| 1,466,040 | 12/1966 | France. |
| 184,855 | 9/1966 | U.S.S.R. |

TOBIAS E. LEVOW, Primary Examiner

P. F. SHAVER, Assistant Examiner